United States Patent [19]

Black

[11] 4,295,686
[45] Oct. 20, 1981

[54] DISK WHEEL WITH RESILIENT BEARING SUPPORT AND RIGID ANNULAR TREAD MOUNTING SURFACE

[75] Inventor: John W. Black, Hickory Corners, Mich.

[73] Assignee: Pemco-Kalamazoo, Inc., Kalamazoo, Mich.

[21] Appl. No.: 146,895

[22] Filed: May 5, 1980

Related U.S. Application Data

[63] Continuation of Ser. No. 964,130, Nov. 27, 1978, abandoned.

[51] Int. Cl.³ .................... B60B 1/06; F16C 33/00
[52] U.S. Cl. ..................... 301/63 DD; 301/105 R; 308/190; 308/191; 428/64
[58] Field of Search ...... 428/64; 301/63 DD, 63 PW, 301/5, 7, 105 R; 308/18, 190, 191

[56] References Cited

U.S. PATENT DOCUMENTS

| | | | |
|---|---|---|---|
| 1,882,498 | 10/1932 | Jarvis | |
| 2,338,294 | 1/1944 | Maule | |
| 2,692,801 | 10/1954 | Rosenberg | 301/63 DD |
| 2,921,344 | 1/1960 | Carrico | 301/63 PW |
| 3,020,091 | 2/1962 | Solomon | 301/63 DD |
| 3,235,312 | 2/1965 | Hollander | 301/63 PW |
| 3,387,894 | 6/1968 | Loulk | 301/63 DD |
| 3,666,322 | 5/1972 | Rickron | 301/63 PW |
| 3,695,728 | 10/1972 | Haussels | 301/63 DD |
| 3,807,817 | 4/1974 | Black | 308/190 |
| 3,815,959 | 6/1974 | Hill | 301/63 PW |
| 3,894,776 | 7/1975 | Black | 301/63 PW |
| 3,952,786 | 4/1976 | Kreling et al. | 301/63 PW |
| 3,968,996 | 7/1976 | Wilcox | 301/63 DD |
| 4,019,789 | 4/1977 | Rosin et al. | 301/63 PW |
| 4,040,670 | 8/1977 | Williams | 301/63 PW |
| 4,071,279 | 1/1978 | Chung | 301/63 PW |
| 4,072,373 | 2/1978 | Black | 308/191 |

FOREIGN PATENT DOCUMENTS

| | | |
|---|---|---|
| 299458 | 10/1928 | United Kingdom |
| 581845 | 10/1946 | United Kingdom |
| 1123704 | 8/1968 | United Kingdom |
| 1169858 | 11/1969 | United Kingdom |
| 1370998 | 10/1974 | United Kingdom |

*Primary Examiner*—William R. Dixon, Jr.
*Attorney, Agent, or Firm*—Blanchard, Flynn, Thiel, Boutell & Tanis

[57] ABSTRACT

A wheel construction including a rigid circular disk having a hole therethrough in the approximate center thereof. A bearing structure housed in a flexible sleeve is resiliently supported in the hole to facilitate a rotation of the disk about a defined axis of rotation. An annulus of moldable synthetic resin material is fixedly secured to the peripheral surface of the disk. The annulus has a rigid characteristic and the periphery thereof defines a tread mounting surface. An annular tread made of moldable synthetic resin material is fixedly secured to the tread mounting surface on the annulus. The tread has an outer diameter that is precisely concentric with the axis of rotation of the wheel. The materials of the tread and of the annulus are compatible with each other such that the tread becomes bonded to the annulus upon a molding thereof around the peripheral surface of the annulus. In one embodiment, the rigid circular disk is composed of a pair of identical metal stampings which are held together solely by the annulus.

5 Claims, 3 Drawing Figures

DISK WHEEL WITH RESILIENT BEARING SUPPORT AND RIGID ANNULAR TREAD MOUNTING SURFACE

This is a continuation application of Ser. No. 964,130, filed Nov. 27, 1978, now abandoned.

This application is related to my copending continuation application Ser. No. 145,279, filed Apr. 30, 1980.

FIELD OF THE INVENTION

This invention relates to a wheel construction and, more particularly, relates to a wheel construction wherein the axis of the preassembled bearing housing is housed in a resilient cylindrical sleeve resiliently supported at the center of the wheel to thereby isolate the bearings from shock loads applied to the wheel and wherein an annular tread made of a moldable synthetic resin material is injection molded onto a rigid moldable synthetic resin tread mounting surface.

BACKGROUND OF THE INVENTION

Wheel construction are known in which a hub is constructed of a rigid moldable synthetic resin, and which has bonded around the outer peripheral surface thereof an annular tread made from a relatively softer moldable synthetic resin. An example of such construction is disclosed in my U.S. Pat. No. 3,894,776. The wheel construction illustrated in my aforementioned patent has proven to be quite satisfactory but for a limited market. Customers purchasing wheels desire the wheel to have a particular appearance characteristic to blend with the structure on which the wheel is to be mounted. Some customers desire the wheel to take on the appearance of a sturdy steel wheel and yet other customers desire the wheel to have the appearance of a hard rubber wheel. Steel appearing wheels are good in some areas of use but where corrosive agents are utilized in the adjacent environment, steel will rust and become unsightly. Thus, and in order to enhance the salability of wheel constructions and still meet the customer's demands, it is highly desirable to provide a structure which will permit the assembly of wheel constructions having the desired aesthetic value to the customer without having to resort to different methods of construction for these wheels.

Accordingly, the objects and purposes of this invention include:

1. The provision of a wheel construction having the known advantages and performance characteristics resulting from a tread made of a moldable synthetic resin being injection molded onto a hub of a rigid synthetic resin, but not limited in appearance to one particular type of material.

2. The provision of a wheel construction, as aforesaid, which will permit me to utilize the same bearing construction that I have used in some of my earlier developments shown in U.S. Pat. Nos. 3,807,817 and 4,072,373.

3. To provide a wheel construction, as aforesaid, which is particularly adaptable for use in the wheels of a caster or the like wherein the treatment received by the bearing assembly, even under normal conditions of use, is severe by any reasonable standard.

4. To provide a wheel construction, as aforesaid, which has a sufficient structural simplicity that it can be assembled rapidly, accurately and inexpensively.

5. To provide a wheel construction, as aforesaid, comprised of a minimum number of parts, each part being of such structural configuration that it is capable of being assembled so that the strength of the assembly is increased during the assembly.

SUMMARY OF THE INVENTION

In general, the objects and purposes of the invention are met by providing a wheel construction having a rigid circular disk having means thereon defining a hole in the approximate center thereof. Bearing means with a resilient sleevelike housing are resiliently supported in the hole to facilitate a rotation of the disk about a defined axis of rotation. An annulus of moldable synthetic resin material is fixedly secured to the peripheral surface of the disk. The annulus has a rigid characteristic and a peripheral surface thereon defining a tread mounting surface. An annular tread made of moldable synthetic resin material is fixedly secured to the tread mounting surface. The tread has an outer diameter that is concentric with the axis of rotation.

BRIEF DESCRIPTION OF THE DRAWINGS

Other objects and purposes of the invention will be apparent to persons acquainted with wheel constructions of this general type upon reading the following specification and inspecting the accompanying drawings, in which.

Certain terminology will be used in the following description for convenience in reference only and will not be limiting. The words "in" and "out" will refer to directions toward and away from, respectively, the geometric center of the device and designated parts thereof. Such terminology will include the words above specifically mentioned, derivatives thereof and words of similar import.

DETAILED DESCRIPTION

Figure 1:
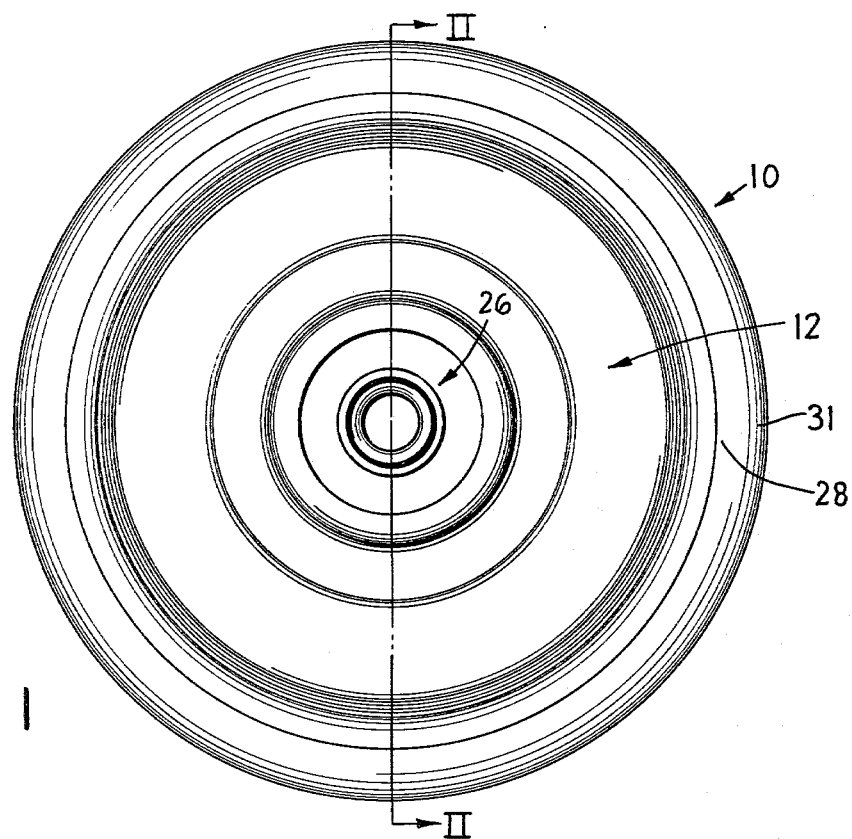
FIG. 1 is a side elevational view of a wheel embodying my invention.
Figure 2:
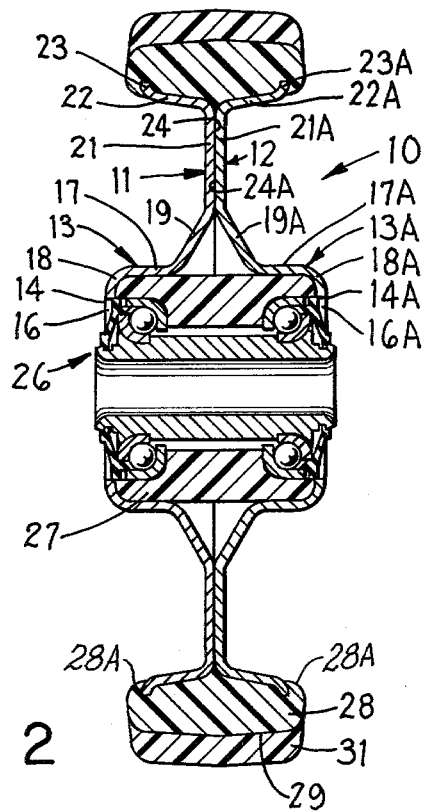
FIG. 2 is a sectional view taken along the line II—II of FIG. 1.

One embodiment of my invention is illustrated in FIGS. 1 and 2. This wheel construction 10 includes a pair of identical metal dislike stampings 11 and 12. For purposes of discussion, the structure of the disk 11 will be described below. The corresponding structure of the disk 12 is identical to the structure associated with the disk 11, but each of the reference numerals used for the disk 11 will be utilized also for the corresponding parts of the disk 12 but will have the suffix "A" added thereto. The dislike stamping 11 includes a cup-shaped section 13 having an end wall 14 with a central opening 16 therethrough connected to a cylindrical wall segment 17 connected to the bottom wall 14 through a rounded corner construction 18. The cylindrical wall segment 17 is connected through an inclinded wall segment 19 to a generally flat and radially extending wall segment 21. The outer periphery of the wall segment 21 is connected to an axially extending flange radially aligned with the wall segment 17 terminating in a radially outwardly extending tip 23. The various segments of the disks are the same but are oriented in a mirror-imagelike manner so that the innermost surfaces 24 and 24A of the wall segments 21 and 21A engage each other along a parting plane and the inclined wall segments 19 and 19A and the cylindrical wall segments 17 and 17A extend away from each other to axially space the end walls 14 and 14A from each other.

The holes 16 and 16A in the end walls 14 and 14A, respectively, are axially aligned. In addition, the cup-shaped sections 13 and 13A define a housing for a bearing construction 26. This bearing construction is identical to the bearing construction shown in my aforementioned U.S. Pat. Nos. 3,807,817 and 4,072,373. Thus, a further detailed discussion of my bearing structure appears to be unnecessary. It should be stated, however, that my bearing construction 26 is housed within a resilient elastomeric sleeve 27 having a hardness in the range of 75 Shore A to 55 Shore D Durometer, preferably 55 Shore D Durometer.

The pair of disks 11 and 12 are held together so that surfaces 24 and 24A are in engagement with each other solely by an annulus of moldable synthetic resin material, particularly acrylonitrile-butadiene-styrene 28. This material is very rigid and is applied around the periphery of the disks by an injection molding process. That is, the disks 11 and 12 are placed into a molding die with the bearing construction 26 mounted within the cup-shaped sections 13 and 13A. When the mold closes, the disks 11 and 12 are tightly held together so that the surfaces 24 and 24A engage each other and the annulus 28 is injection molded around the periphery of the disks 11 and 12. More specifically, the portions 28A of the material of the annulus extend radially inwardly around the axially facing sides of the tips 23 and 23A to a terminal location radially inwardly of the most axially outwardly portion of the tips 23 and 23A as shown in FIG. 2. Upon a solidifying of the annulus 28, the disks 11 and 12 are fixedly held together and no other mechanical connection is required to hold the disks 11 and 12 together. The radial periphery 29 of the annulus 28 defines a tread mounting surface. An annulus of moldable synthetic resin tread material, particularly polyurethane, defines the tread 31. As has been explained in my U.S. Pat. No. 3,894,776, there is an affinity of polyurethane to acrylonitrile-butadiene-styrene material especially when the polyurethane is injection molded onto the hardened acrylonitrile-butadiene-styrene surface. As a result of the foregoing construction, I have been able to utilize the technology developed and covered in my U.S. Pat. No. 3,894,776, but with a wheel construction utilizing steel disks 11 and 12 and further utilizing my known and widely accepted bearing construction 26. In addition, the method of assembly of the wheel by placing the parts into a mold structure assures that the periphery of the treadstick 31 is precisely concentric about the axis of rotation defined by the central axis of the bearing construction 26. Further, the resilient characteristic of the sleeve 27, which sleeve separates the bearing races from the material of the disks 11 and 12, effects an isolation of the bearings from shock loads applied to the wheel.

Figure 3:
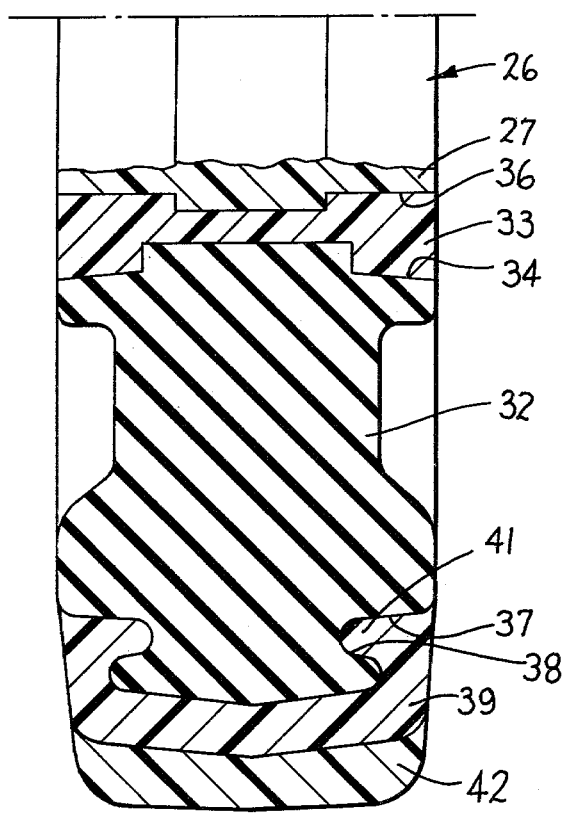
FIG. 3 is a fragmentary central sectional view taken through a modified wheel construction.

Referring now to FIG. 3, some customers prefer the wheel construction to have the appearance of a hard rubber tire. In the embodiment of FIG. 3, I use a hard rubber material 32 which is joined to the bearing construction 26 by injection molding a quantity of moldable synthetic resin material 33 between the inner surface 34 of a central hole in the rubber material 32 and the outer peripheral surface 36 of the elastomeric sleeve 27 in the bearing construction 26. This method of assembly and related structure are disclosed in my aforementioned U.S. Pat. No. 4,072,373. Accordingly, further discussion about this construction appears unnecessary.

A facet of the construction of the embodiment in FIG. 3 is that hard rubber is incompatible with acrylonitrile-butadiene-styrene and there will be no mutual adherence of the acrylonitrile-butadiene-styrene material to the peripheral surface 37 of the hard rubber disk 32. Therefore, I provide a pair of oppositely axially opening annular grooves 38 adjacent the periphery of the hard rubber disk 32. I then injection mold an annulus 39 of acrylonitrile-butadiene-styrene material around the periphery of the hard rubber disk 32. Since acrylonitrile-butadiene-styrene material has a very rigid characteristic, the portion 41 of the acrylonitrile-butadiene-styrene material in the grooves 38 effects a mechanical coupling of the annulus 39 to the periphery of the hard rubber disk 32. I thereafter injection mold a treadstock 42 around the periphery of the hardened annulus 39. As in the preceding embodiment, the treadstock is made of a polyurethane material. Thus, when the polyurethane material forming the treadstock is injection molded around the periphery of the annulus 39, the polyurethane will, as in the preceding described embodiment, substantially completely encase the periphery of the annulus 39 in such close and intimate contact that a fusion bonding occurs between the annulus 39 and the treadstock 42 to thereby firmly and securely lock the treadstock to the annulus 39.

Thus, and due to the construction in the embodiment illustrated in FIG. 3, I can provide a structure having the appearance of a hard rubber tire to customers desiring this form of construction and appearance rather than the appearance of metal and with little, if any, change in the manufacturing technique.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A wheel construction, comprising:
   rigid circular disk means having means thereon defining a hole in approximately the center thereof, said disk means having a radially outwardly facing surface thereon, a pair of laterally spaced axially outwardly facing surfaces contiguous with said radially outwardly facing surface and at least a pair of laterally spaced, radially inwardly facing surfaces on opposite axial sides thereof each contiguous with an axially facing surface;
   bearing means and resilient means for mounting said bearing means in said hole to facilitate the rotation of said rigid circular disk means about a defined axis of rotation;
   an annulus made of a rigid first moldable synthetic resin material and securing means for fixedly securing said annulus to said rigid circular disk means, said securing means comprising at least a pair of integral portions of the material of said annulus on opposite lateral sides thereof extending radially inwardly around said axially facing surfaces and axially inwardly and in contact with said axially facing and said radially inwardly facing surfaces on said disk means, said annulus having no fusion bonding affinity to the material of said disk means, said annulus also having a peripheral surface thereon defining a tread mounting surface; and an annular tread made of a second moldable synthetic resin material in close and intimate contact with said peripheral surface on said annulus and fusion bonding said tread and said annulus together thereby to firmly and securely lock said tread to said annulus.

2. A wheel construction according to claim 1, wherein said rigid circular disk means is made of metal.

3. A wheel construction, comprising:

a pair of identically shaped metal stampings, each having a central cylindrical cup-shaped section axially aligned with the other, each cup-shaped section having an axle receiving hole therethrough which is axially aligned with the other axle receiving hole, each of said metal stampings having a portion extending radially outwardly from said cup-shaped sections, the innermost surfaces of which are coextensive with a central plane through said wheel construction and engage each other, which central plane is perpendicular to said axis of rotation, said metal stampings each having an axially extending tip segment adjacent the peripheral surface of said radially outwardly extending portion;

bearing means and resilient means for mounting said bearing means in said axially aligned cup-shaped sections, said resilient means isolating said bearing means from said metal stampings and extending between said cup-shaped sections;

an annulus made of a rigid first moldable synthetic resin material and securing means for fixedly securing said annulus to said metal stampings, said securing means comprising at least a pair of integral portions of the material of said annulus on opposite lateral sides thereof extending radially inwardly to cover at least said axially extending tip segments to thereby effect a fixed securement of said metal stampings together, said annulus also having a peripheral surface thereon defining a tread mounting surface; and an annular tread made of a second moldable synthetic resin material in close and intimate contact with said peripheral surface on said annulus and fusion bonding said tread and said annulus together thereby to firmly and securely lock said tread to said annulus.

4. A wheel construction according to claim 3, wherein said resilient means comprises an elastomeric sleeve housing said bearings therein.

5. A wheel construction according to claim 3, wherein said first moldable synthetic resin material is acrylonitrile-butadiene-styrene; and wherein said second moldable synthetic resin material is polyurethane.

* * * * *

UNITED STATES PATENT AND TRADEMARK OFFICE
CERTIFICATE OF CORRECTION

PATENT NO. : 4 295 686
DATED : October 20, 1981
INVENTOR(S) : John W. Black

It is certified that error appears in the above—identified patent and that said Letters Patent is hereby corrected as shown below:

Col. 1, line 23; change "construction" to ---constructions---.

Col. 2, line 47; change "dislike" to ---disklike---.

Col. 3, line 52; change "treadstick" to ---treadstock---.

Signed and Sealed this

*Ninth* Day of *February 1982*

[SEAL]

*Attest:*

GERALD J. MOSSINGHOFF

*Attesting Officer*     *Commissioner of Patents and Trademarks*